(No Model.)

J. F. KENNEDY.
EGG SEPARATOR.

No. 460,875. Patented Oct. 6, 1891.

Witnesses
Albert Speiden.
Van Buren Hillyard.

Inventor
John F. Kennedy.
By his Attorneys
R.S.&A.P. Lacey

UNITED STATES PATENT OFFICE.

JOHN FRANKLIN KENNEDY, OF CADIZ, OHIO.

EGG-SEPARATOR.

SPECIFICATION forming part of Letters Patent No. 460,875, dated October 6, 1891.

Application filed June 25, 1891. Serial No. 397,436. (No model.)

*To all whom it may concern:*

Be it known that I, JOHN FRANKLIN KENNEDY, a citizen of the United States, residing at Cadiz, in the county of Harrison and State of Ohio, have invented certain new and useful Improvements in Egg-Separators; and I do hereby declare the following to be a full, clear, and exact description of the invention, such as will enable others skilled in the art to which it appertains to make and use the same.

This invention relates to a device for separating the whites of eggs from the yelk.

The improvement consists of a cup or receptacle having a settling-chamber in its bottom to receive the yelk, which being the heavier is precipitated to the bottom, and having a discharge-slot in its side.

The improvement further consists in an annular flange at the top of the said settling-chamber to direct the white of the egg to the said discharge-slot.

The improvement also consists of the novel features and the peculiar construction and combination of the parts, which will be hereinafter more fully described and claimed, and which are shown in the annexed drawings, in which—

Figure 1:
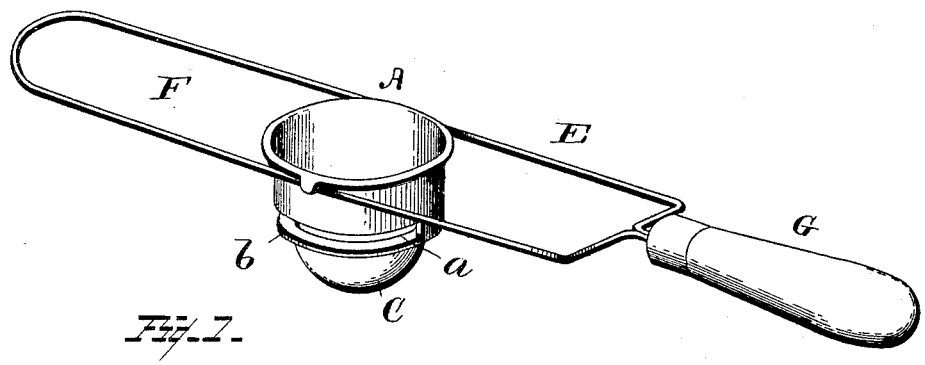
Figure 2:
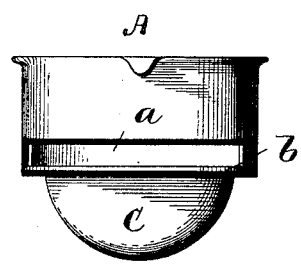
Figure 3:
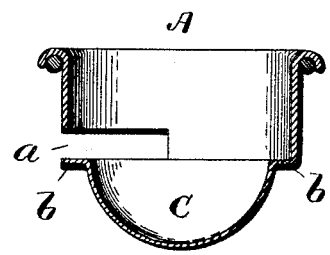
Figure 4:
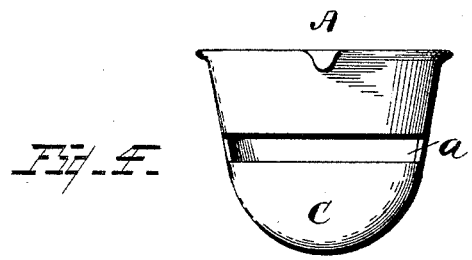

Figure 1 is a perspective view of the invention. Fig. 2 is a side view of the separator detached from the handle, the discharge-slot being directly in the front. Fig. 3 is a cross-section showing the handle attached to the separator. Fig. 4 is a modification.

The cup A is provided in its side at a proper point between its top edge and bottom with a discharge-slot $a$, which is long and narrow. The settling-chamber C in the bottom of the cup is approximately semi-spherical in shape and about equal in capacity to the bulk of the yelk of an ordinary egg. The annular flange or offset $b$ at the top of the settling-chamber receives the white of the egg as it is displaced from the settling-chamber by the yelk, and directs the same to the discharge-slot $a$. The upper portion of the separator above the flange or offset $b$ prevents the overflow and too rapid discharge of the white of the egg, and retains the same until it is discharged through the slot $a$, and serves as a guard or retainer simply. The separator may be made of glass, pottery-ware, vulcanized rubber, metal, or any plastic composition.

For convenience of manipulating the separator, a handle E is provided, which consists of a wire frame F, as shown, and a handle G. The sides of the frame F engage with lips at diametrically-opposite sides of the separator.

To use the separator the eggs are broken one at a time and dumped from the shells into the cup. The yelk settles into the chamber C, and the white is discharged through the slot $a$. After the white of the egg has been discharged the yelk is placed in a suitable receptacle by turning the separator over, and the other eggs to be separated are treated in the same manner.

Fig. 4 shows a modification in which the offset or flange $b$ is omitted.

Having thus described my invention, what I claim, and desire to secure by Letters Patent, is—

1. An egg-separator comprising a settling-chamber and a guard open at its top and projected from and surrounding the said settling-chamber and having a discharge-slot in its side between the settling-chamber and guard, substantially as shown and described.

2. An egg-separator having a settling-chamber in its bottom, a slot in its side, and having an annular offset or flange at the top of the said chamber, substantially as and for the purpose specified.

3. An egg-separator having a semi-spherical settling-chamber in its bottom and having a discharge-slot in its side, and having an annular flange between the said chamber and slot, substantially as described, for the purpose set forth.

4. The combination, with an egg-separator having an open top and a discharge-opening in its side midway between its top and bottom and having exterior lips at diametrically-opposite sides, of a rectangular wire frame provided with a handle, substantially as set forth.

In testimony whereof I affix my signature in presence of two witnesses.

JOHN FRANKLIN KENNEDY.

Witnesses:
    WALTER G. SHOTWELL,
    J. M. KENNEDY.